United States Patent [19]
Warner

[11] Patent Number: 5,159,846
[45] Date of Patent: Nov. 3, 1992

[54] APPARATUS FOR MOVING AN INDEXING TABLE

[76] Inventor: Michael V. Warner, 45 Park Street, E. Zip Code L5G IL8, Mississauga, Ontario, Canada

[21] Appl. No.: 753,408

[22] Filed: Aug. 30, 1991

[51] Int. Cl.$^5$ ............................................. B23Q 17/00
[52] U.S. Cl. ...................................... 74/69; 74/22 R; 74/84 R; 74/393
[58] Field of Search ................. 74/22 R, 68, 69, 84 R, 74/89.14, 89.17, 393; 475/14, 334, 346

[56] References Cited

U.S. PATENT DOCUMENTS

| | | | |
|---|---|---|---|
| 2,775,128 | 12/1956 | Young | 74/49 |
| 2,784,612 | 3/1957 | Liska | 74/393 |
| 2,788,673 | 4/1957 | Liska | 74/393 |
| 2,868,032 | 1/1959 | Miller | 74/436 |
| 4,075,911 | 2/1978 | Brems | 74/816 |
| 4,512,214 | 4/1985 | Surman | 74/820 |
| 4,528,860 | 7/1985 | Barr | 74/52 |

FOREIGN PATENT DOCUMENTS

| | | |
|---|---|---|
| 1071600 | 12/1959 | Fed. Rep. of Germany . |
| 994034 | 11/1951 | France . |
| 4738930 | 10/1968 | Japan . |
| 279995 | 4/1952 | Switzerland ........................... 74/393 |

*Primary Examiner*—Richard Lorence
*Assistant Examiner*—William O. Trousdell
*Attorney, Agent, or Firm*—Donald E. Hewson

[57] ABSTRACT

An apparatus for rotatably moving and positioning an indexing table is disclosed. The apparatus of the present invention allows an indexing table to be quickly rotated between a plurality of index positions to within an accuracy of less than 0.001 inches on a repeated basis. Further, the apparatus has no looseness or physical separation between motion transmission elements while at or near each index position that would otherwise allow for externally induced movement of the indexing table. While at or near each index position, a first side of the cogs of a first planetary gear is kept in continual contact with the first side of the cogs of a main gear, and the second side of the cogs of a second gear is kept in continual contact with the second side of the cogs of a main gear. Also, a first interfacing portion of a first rotating drive mechanism is kept in continual contact with a first interfacing surface on the indexing table, and a second interfacing portion of a second rotating drive mechanism is in continual contact with a second interfacing surface on the indexing table. Thus, a drive arrangement is achieved that can drive the indexing table rotationally in either of two directions without any physical lag or looseness due to gear backlash while the indexing table is at or near each index position.

21 Claims, 5 Drawing Sheets

APPARATUS FOR MOVING AN INDEXING TABLE

FIELD OF THE INVENTION

This invention relates to indexing tables for use in holding and moving workpieces and more particularly to the drive mechanism that moves such indexing tables such that the workpieces are placed and held very accurately in position. Such accuracy is necessary on a repetitive basis so that such work pieces may be worked on by robots.

BACKGROUND OF THE INVENTION

In modern society, many of the products we own or consume are manufactured. Such products are typically manufactured by industry in relatively large or very large quantities. Indeed, much of modern industry is based on the manufacture of finished products or parts to be used in products. Generally, most manufacturing is done on an assembly line or an assembly station, whether it is done by hand or done by an automated process, or a combination of both. In any event, the process is very repetitive since the main purpose is to produce a large quantity of similar or same products.

Originally, all types of manufacturing, including repetitive manufacturing, were done by hand, or at least virtually all by hand, with the aid of appropriate tools. During the industrial revolution, many manufacturing processes were mechanized to a degree, although generally to a very rudimentary degree by most modern standards. Indeed, these manufacturing processes still relied very highly on human effort to produce an end result, whether it be a part or a finished product. With modern advances in technology, repetitive manufacturing has become very much more automated. In very recent times, many manufacturing processes are completely automated, or at least portions thereof are completely automated. A high degree of automation is generally quite advantageous, generally for reasons such as improved quality, reduced costs, and increased volume of productivity.

The most recent thrust in terms of automation in industry, is to use robots to perform tasks such as placing and holding objects and articles during manufacturing. An advantage of this is that robots can place and manipulate articles of many different shapes and sizes very quickly and with a great deal of accuracy, even on a repetitive basis.

Robots can place and manipulate parts with a very high degree of accuracy. Depending on the particular circumstance on accuracy of 0.001", or even less, can be achieved virtually without fail on a repetitive basis. Generally it is also necessary to achieve the same degree of accuracy when placing or positioning a product, commonly referred to as a workpiece, for receiving a part from a robot.

Typically, workstations having some sort of level surface are used to retain and move workpieces located thereon such that the workpieces may be accessed by a robot. Such workstations often resemble tables and are usually referred to as indexing tables. In use, indexing tables are moved, usually rotationally, such that workpieces thereon are brought to the required position for receiving parts or to be worked on by a robot. Indexing tables are typically very heavy and it is very difficult to move the table quickly and at the same time to have the table stop such that the workpiece is positioned to within 0.001". Such accurate positioning of workpieces on indexing tables is desirable, if not necessary, for using indexing tables in conjunction with robots.

Further, it is also necessary that the drive mechanism that causes rotation of the indexing table also hold the indexing table rigidly in position—virtually without movement while being accessed by the robot.

An indexing table is typically used to move workpieces into position to be worked on by a person, a machine, or more commonly a robot or robotic arm. There are typically a plurality of stations on an indexing table, with each station adapted to receive a workpiece. The indexing table is rotated such that each station is stopped at one or more external reference points. Typically, at each external reference point a robotic arm or the like will add a piece to the workpiece or perform a task on the workpiece. A common arrangement for workstations on an indexing table is to have two workstations spaced around the indexing table, the workstations being spaced 180° apart from each other. Correspondingly, there is one external reference point for each workstation. At one reference point the workpieces are placed on and removed from the workstations. At the other reference point, the workpieces are worked on.

One very important aspect of moving workpieces from workstation to workstation is the time taken for such movement. It is desirable that this time be minimized since it is non-productive time. In order to move the indexing table between workstations as quickly as possible, it is necessary to rotationally accelerate the indexing table as quickly as possible, but also smoothly to preclude any jerking effect. Such a jerking effect could cause workpieces to be disturbed or parts to fall therefrom.

DESCRIPTION OF THE PRIOR ART

U.S. Pat. No. 2,784,612 to LISKA discloses a mechanism for imparting rotary motion to an indexing table. Basically, the mechanism is designed to impart a rotary motion to the indexing table, with the indexing table progressively increasing in rotational speed between one station and a point that is midway to the next station, and then progressively decreasing to a 0 speed at the next station. The crank shaft is driven through a worm gear assembly by a drive shaft. Attached to the crank shaft is a crank arm and a first planetary gear, which is rotatably attached to the crank arm. Rotation of the crank shaft causes corresponding rotation of the crank arm and also corresponding movement of the first planetary gear in a circular path. The movement of the first planetary gear causes a second gear to rotate. This second gear is mounted such that is moves horizontally in addition to rotating. As the second gear is rotated by the first planetary gear, the second gear also slides away from the crank shaft. Initially, much of the movement of the first planetary gear is used to move the second gear horizontally with very little of the movement of the first planetary gear being used to rotate the second gear. Thus, initially the second gear has a low rotational speed. As the second gear moves away from the crank shaft, its rotational speed increases to a maximum. The rotary motion is transmitted to an intermediate disk and then to a flange, both of which have a tongue and groove arrangement to accommodate horizontal movement while imparting rotational movement. The indexing table is locked to the base by an index pin that engages in a pair of recesses.

U.S. Pat. No. 4,528,860 to BARR discloses a transfer drive apparatus wherein the drive shaft is rotated by a suitable drive means at one end and at the other end is attached to an elongated crank arm. The other end of the crank arm has a planetary gear rotatably secured thereto. The planetary gear is driven around a stationary gear, which is concentric with the drive shaft. A follower pin is located eccentrically on the planetary gear. The pin is connected to an elongated arm which is in turn pivotally connected to the transfer apparatus.

U.S. Pat. No. 4,512,214 to SURMAN discloses a station locking rotary indexing table that has a base support and a table top element that rotates around the base support. The table top element is fastened to a Geneva drive disk that is used to index the table top element as it rotates around. A first rotor rotates over a support and a second rotor, which in turn rotate a first cam follower that is eccentrically placed on the second rotor. The cam follower pushes a slide within a groove and also engages one notch of the Geneva drive disk and turns the disk one index increment before disengaging it. The slide becomes located between two cam followers on the disk when the first cam follower is not engaged in the notch.

U.S. Pat. No. 2,868,032 to MILLER discloses an indexing mechanism that has a rotating member that is to be indexed, which has as part of it a plurality of ways that are used to index the member. A drive shaft is rotated, which in turn causes a gear segment to rotate. The gear segment engages with a pinion and causes one complete rotation of the pinion. During this one complete rotation of the pinion, a follower that is connected to the pinion by an indexing arm is introduced to one of the ways in the rotating member, which in turn effects movement of the rotating member rotatably by one angular segment.

U.S. Pat. No. 2,775,128 to YOUNG discloses a device for changing circular motion to rectilinear motion. Basically, a driving member rotates about an axis and is driven by a drive shaft. Within the driving member is a circular cavity that is offset from the center of the driving member. As the driving member rotates, a side wall of the cavity comes in contact with a pin that is contained within the slot. The pin is pushed along the slot by the side wall of the cavity.

German Patent 1,071,600 to WACKER discloses a mechanism having a hollow shaft that is driven by some sort of drive means, which in turn rotates a first planetary gear. This first planetary gear in turn acts as an arm and moves a planetary gear around a small stationary gear on a solid shaft. Alternatively, the solid shaft 6 can rotate the planetary gear, which would merely rotate in place on the first planetary gear.

Japanese Paten 47-38930 discloses an intermittent reciprocating mechanism for rotating an indexing table having a planetary gear that is rotated around a stationary gear. The planetary gear is rotatably attached to a third gear and is moved around the stationary gear by rotating the third gear. The planetary gear has a pinion extending therefrom which is engaged in a slot in the table. The table is moved back and forth in a reciprocating motion.

French Patent 994,034 to ARRAGON discloses a mechanism having a drive shaft that rotates a counterweighted arm. There is a pair of planetary gears attached in freely rotatable relation to the counterweighted arm with the planetary gears being intermeshed with each other. One of the two planetary gears engages with a stationary gear. The shaft of one planetary gear extends upwardly through the arm and in turn is connected to another arm that has a small pinion extending upwardly therefrom. Conceivably, this pinion could be used to drive a rotating indexing table.

SUMMARY OF THE INVENTION

The present invention provides an apparatus for rotationally moving an indexing table between a plurality of precisely defined positions and maintaining the indexing table rigidly in any of these positions. Typically, the motion of the indexing table will be a rotary motion. The indexing table may be repeatedly positioned to within less than 0.001" and is held rigidly at the stopped position virtually without movement, and certainly to movement of less than 0.001".

The indexing table is intended for carrying at least one workpiece between a plurality of precisely defined index positions so that work can be performed on the workpieces at the at least one of said plurality of precisely defined positions.

The apparatus includes a first planetary gear mounted so as to be rotatably and translatably movable with respect to the indexing table, with the first planetary gear mounted so as to be rotatably and translatably movable with respect to the indexing table, with the second planetary gear having cogs at the perimeter thereof. There is a main gear also having cogs at the perimeter thereof intended for intermeshing with the cogs of the first and second planetary gears.

The gear ratio of the planetary gears to the main gear may be virtually any ratio. It is preferable that the gear ratio be such that the larger of the two numbers be an integer multiple of the smaller of the two numbers. Such gear ratios would typically include 1:1, 1:2, 1:3, 1:4, 1:5, 1:6, and the like. Typically, the numbers in a gear ratio are reduced to the smallest whole numbers possible. For example, if two gears have 50 and 100 teeth respectively, then the gear ratio is typically expressed as 1:2. If two gears have 60 and 100 teeth respectively, then the gear ratio is typically expressed as 3:5.

One consideration when choosing gear ratios in respect of the present application is how may times the planetary gear rotates about its centre axis while travelling once about the main gear. This can be determined by reducing the gear ratio until the lower of the two numbers equals 1. For a gear ratio of 1:2 the planetary gear will rotate 2 times about its own axis while travelling once about the main gear. For a gear ratio of 3:5, which reduces numerically to 1:1.66, the planetary gear rotates one and two-thirds times while travelling once around the main gear. It can be seen that if a gear ratio reduces to a ration of 1:n, where n is an integer, then the planetary gear rotates an integer number of times while travelling once around the main gear. This means that a given cog on the main gear will always be contacted by a given cog on an intermeshed planetary gear. This is important in the present application because an index position is reached every time the planetary gear rotates once about its own axis. A gear ratio of 1:2 would therefore dictate that there be two index positions around the indexing table.

For gear ratios that do not ultimately reduce to a ratio of 1:n, where n is an integer, determining the number of index positions around the indexing table is slightly more complicated. For a gear ratio of 3:5, which ultimately reduces to 1:1.66, there would appear to be one and two-thirds index positions around the indexing table. In actuality, there would be five index positions, but each index position would be stopped at every third time the planetary gear travels around the indexing table.

There is also a moving means for effecting translational motion of the first planetary gear and the second gear with respect to the main gear. The moving means is preferably in the form of a drive shaft with a drive arm rigidly connected to the end of the drive shaft and also connected to the first and second gears. The first and second gears are interconnected such that translational movement of one effects corresponding translational movement of the other and the first planetary gear and the second gear are each engaged with a main gear. The first planetary gear and second gears are caused to rotate about their respective center axes by intermeshing with the main gear when moved translationally by the moving means in a circular path about the main gear.

The first planetary gear is part of a first rotating drive mechanism, which also includes a first crank arm and a first hub. The first hub rigidly connects the first planetary gear and the first crank arm. The first crank arm moves rotationally and translationally in direct conjunction with the first planetary gear. The first crank arm includes a first pinion extending therefrom and also having a first cam roller thereon. The first cam roller is the interfacing portion of the first rotating drive mechanism and it interfaces with the indexing table, with the interfacing portion being located offset to the axis of rotation of the first planetary gear, wherein the interfacing portion interfaces with a first receiving surface on the indexing table. Further, the second rotating drive mechanism is similarly configured and has a second interfacing portion that interfaces with the indexing table, with the second interfacing portion being located offset to the axis of rotation of the second gear, wherein the second interfacing portion interfaces with a second receiving surface on the indexing table.

The cogs on the first and second planetary gears each have a first side and a second side. The first side of the cogs of the first planetary gear contact an opposed first side of the cogs at the main gear, and the second side of the cogs of the second gear contact an opposed second side of the cogs of the main gear. Such contact on a continual basis is necessary because it precludes any gaps from existing between two opposed cogs. If there are gaps between opposed cogs then there is an inherent looseness in the drive system which causes loss of accuracy in the positioning of workstations. Further, such gaps would allow the workstation to be readily be moved—even if only by a small amount—once the workstation has been positioned at its desired position.

In use, the moving means is generally driven by an electrical motor, with the electrical motor producing rotational movement. There may be a gearbox between the electrical motor and the moving means in order to obtain the correct speed of movement of the moving means. The moving means comprises a drive shaft that is generally centrally located within the indexing table, with a drive arm at the top of the drive shaft For the purposes of driving the table in a first direction, the first side of the cogs of the first planetary gear remain in continual contact with the first side of the cogs of the main gear and the first interfacing portion of the first rotating drive mechanism in continual contact with a first interfacing surface on the indexing table. By keeping a first side of the cogs of the first planetary gear in continual contact with the first side of the cogs of the main gear, and by keeping the first interfacing portion of the first rotating drive mechanism in continual contact with a first interfacing surface on the indexing table a drive arrangement is achieved that can drive the indexing table rotationally in a first direction without any physical lag or looseness due to backlash.

Conversely, for the purposes of driving the table in a second and opposite direction, the second side of the cogs of the second planetary gear remain in continual contact with the second side of the cogs of the main gear and the second interfacing portion of the second rotating drive mechanism in continual contact with a second interfacing surface on the indexing table. By keeping a second side of the cogs of the second planetary gear in continual contact with the second side of the cogs of the main gear, and by keeping the second interfacing portion of the second rotating drive mechanism in continual contact with a second interfacing surface on the indexing table a drive arrangement is achieved that can drive the indexing table rotationally in a second direction without any physical lag or looseness due to backlash.

It should be understood that such contact on a continual basis is necessary only at or near each index position, since it is only at each index position where accuracy of placement is necessary. Continual contact does however occur between the first rotating drive mechanism or the second rotating drive mechanism and its corresponding interfacing surface, depending on the direction the table is being driven, in order to drive the table. The other of the two rotating drive mechanisms may remain in contact with its corresponding interfacing surface, but this is not necessary. Further, continual contact does also occur between the first side of the cogs of the first planetary gear and the first side of the cogs of the main gear, or the second side of the cogs of the second planetary gear and the second side of the cogs of the main gear, again depending on the direction the table is being driven, in order to drive the table. The other of the first or second sides of the cogs may remain in contact with the corresponding first or second side of the opposed cog, but this does not necessarily occur.

It has been found that continual contact is typically not maintained on the non-driving side, for either or both of the two opposed cogs or the rotating drive mechanism and its corresponding interfacing surface, through about the middle third of the arc between any two adjacent index positions. As stated earlier, contact on a continual basis is necessary only at or near each index position, since it is only at each index position where accuracy of placement is necessary.

BRIEF DESCRIPTION OF THE DRAWINGS

Embodiments of this invention will now be described by way of example in association with the accompanying drawings in which.

DETAILED DESCRIPTION OF THE PREFERRED EMBODIMENTS

Figure 1:
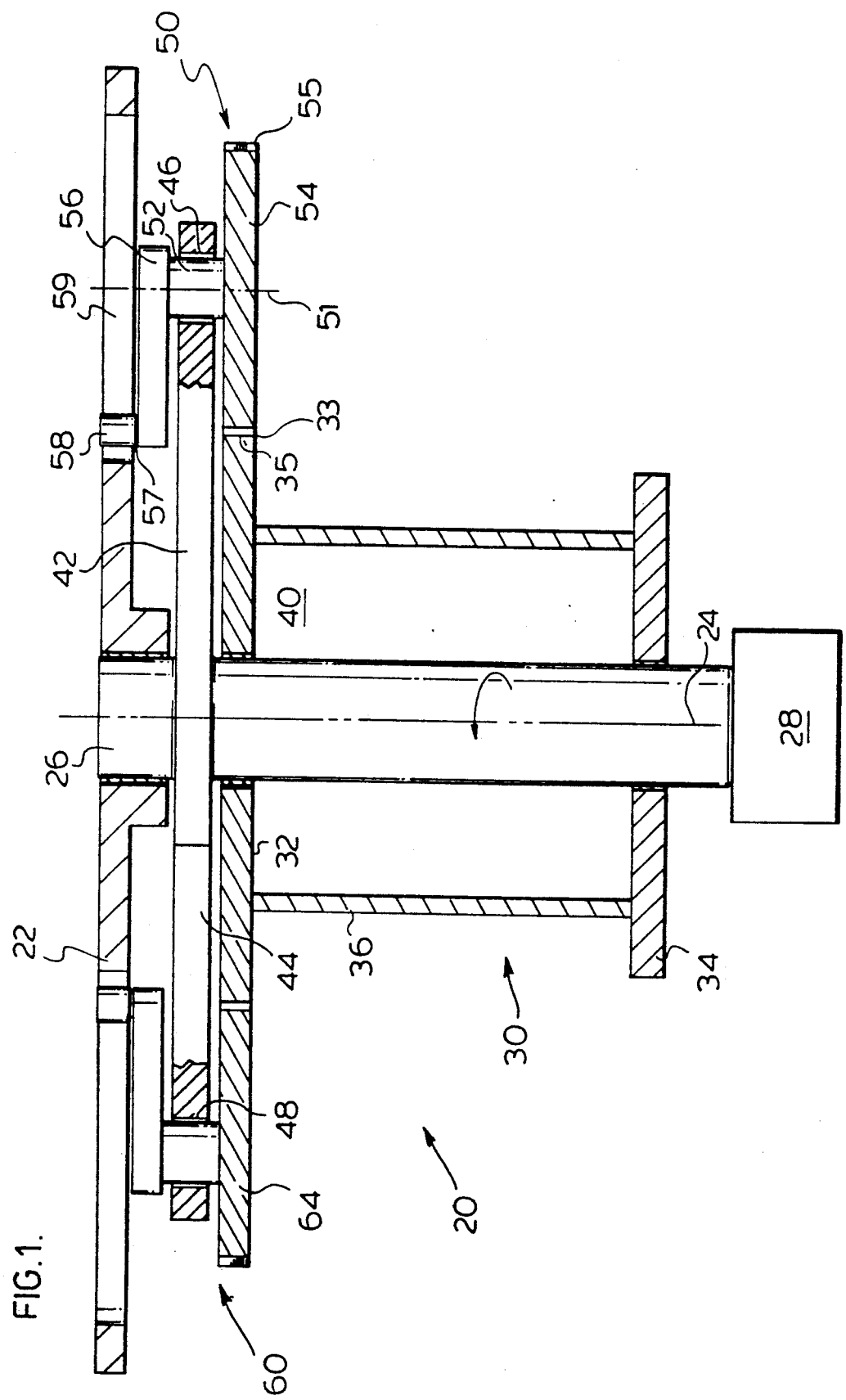
FIG. 1 is a partially cut-away side view of the apparatus of the present invention.

Reference will now be made to FIG. 1 in which the apparatus 20 is shown, wherein the apparatus 20 rotates a table 22 around a central axis 24. The apparatus comprises a main shaft 26 that is rotated around a generally vertical central axis 24 by a drive motor 28. The main shaft 26 is housed in a base 30 that in turn comprises an upper base portion 32 and a lower base portion 34 which are adjoined by a central portion 36.

The main shaft 26 rotates freely within the base 30 and has at or near its top end table 22. The table 22 rotates freely around the main shaft 26 and is not directly driven by the main shaft 26. Rigidly attached to the main shaft 26, just below the table 22, is a drive member 40. The drive member 40 comprises a first drive arm 42 and a second drive arm 44. The first drive arm 42 and the second drive arm 44 are displaced on opposite sides of the drive member 40 and have their centers 180° apart around the central axis 24. Near the end of the first and second drive arms 42, 44 are first and second apertures 46, 48 respectively. The first aperture 46 and the second aperture 48 are spaced 180° apart from each other around the central axis 42. At or near the end of each of the first drive arm 42 and the second drive arm 44, and generally retained by the first aperture 46 and second aperture 48 respectively, are first and second rotating drive mechanisms 50 and 60. Reference will first be made to the first rotating drive mechanism 50. The second rotating drive mechanism 60 is virtually identical to the first rotating drive mechanism 50. The first rotating drive mechanism 50 comprises a first hub 52 which is generally retained within the first aperture 46 and is freely rotatably engaged therein. Rigidly attached to the first hub 52 is a first planetary gear 54, which in turn meshes with the upper base portion 32 of the base 30, which is actually a stationary gear 33. At its other end, the first hub 52 is rigidly attached to a first crank arm 56. The first hub 52 and the first planetary gear 54 are each of circular cross-section, with the first planetary gear 54 of course having cogs around the perimeter thereof. The first hub 52 and the first planetary gear 54 share a common first planetary centre axis 51 which is their axis of rotation. The first crank arm 56 extends outwardly from the first hub 52 to a point beyond the cogs 55 of the first planetary gear 54. Extending upwardly from the first crank arm 56 is a first pinion 56 which has a first cam roller 58 retained thereon in freely rotatably relation. The first cam roller 58 interfaces with a first interfacing surface 59 on table 22. The first cam roller 58 is in constant contact with the first interfacing surface 59.

Figure 2:
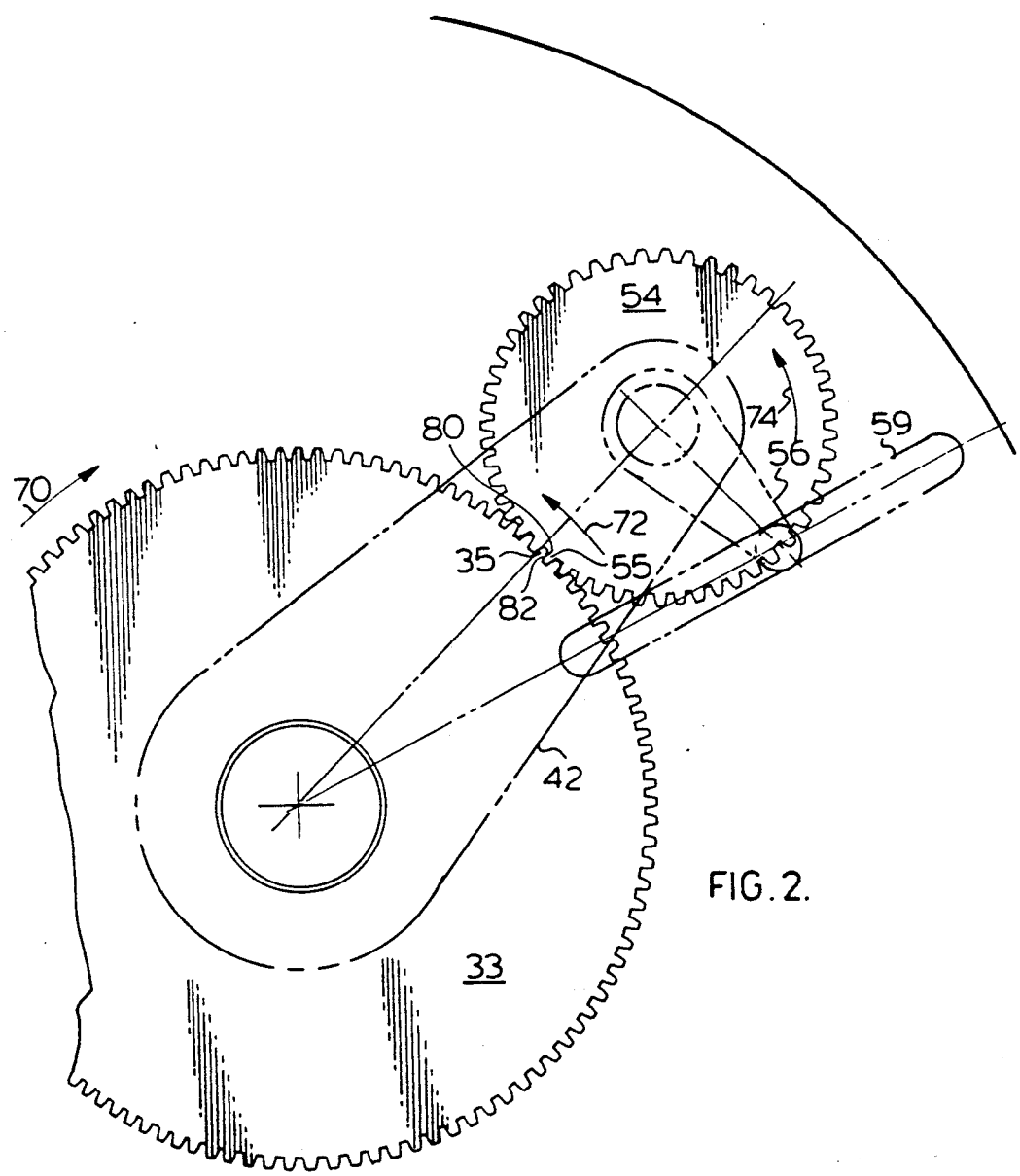
FIG. 2 is a partial top view of the apparatus in FIG. 1.

The operation of the apparatus 20 in association with the table 22 will now be described with reference to FIGS. 1 through 4. In use, the drive motor 28 rotates the main shaft 26 in either a clockwise direction 70 or a counter-clockwise direction 72 about the central axis 24. As shown in FIG. 2, the main shaft 26 is rotating in a counter-clockwise direction 72 about the central axis 24 and is therefore rotating the first drive arm 42 in the same counter-clockwise direction 72. The first drive arm 42 is in turn moving the first rotating drive mechanism 50 around the central axis 24 and the same counter-clockwise direction 72. Actually, the first rotating drive mechanism 50 is moving around the perimeter of the stationary gear 33. The cogs 55 on the first planetary gear 54 mesh with the cogs 35 on the stationary gear 33, which causes the first planetary gear 54 and in turn the entire first rotating drive mechanism 50 to rotate about a first planetary axis 51 in a counter-clockwise direction 74.

Figure 3:
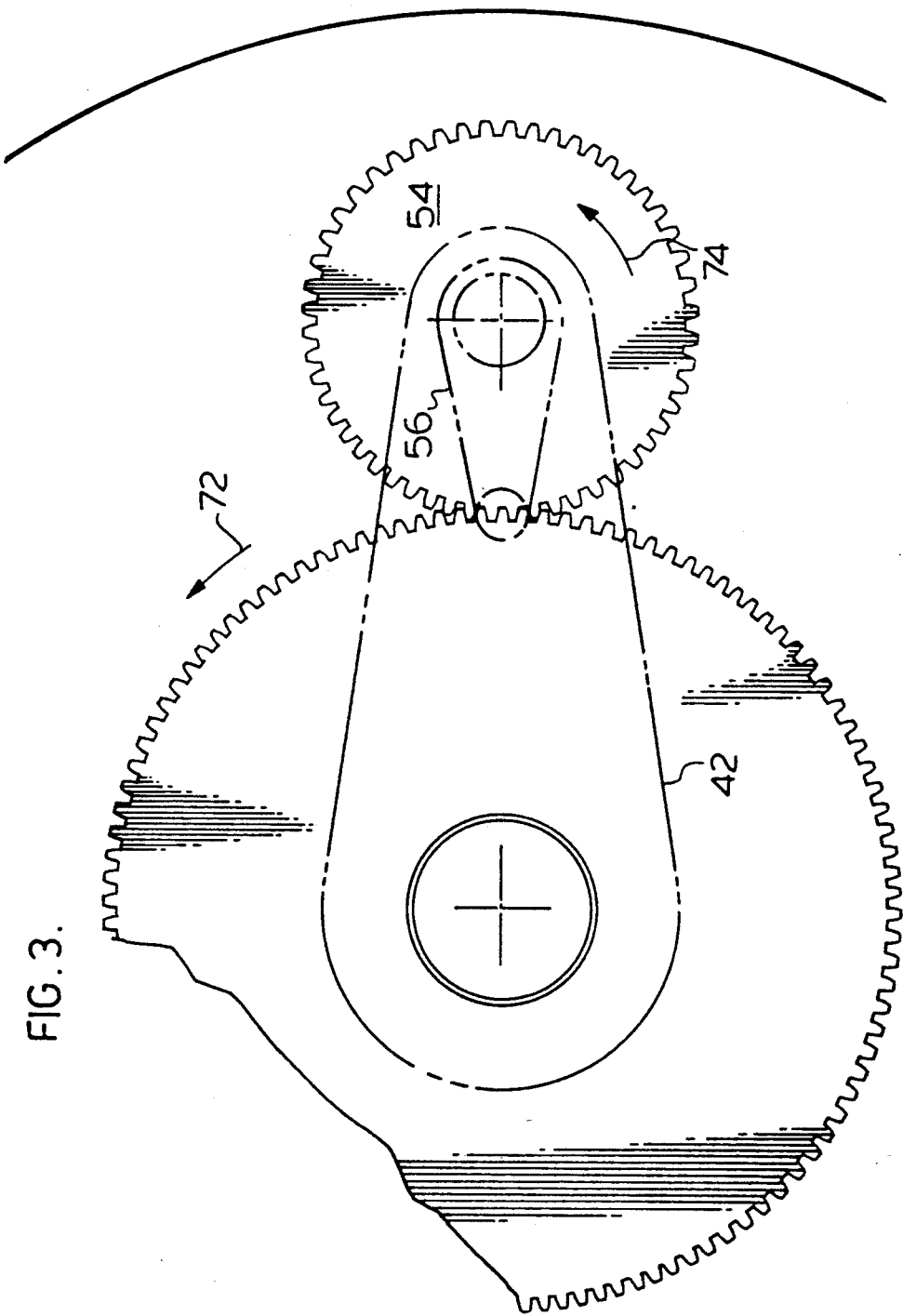
FIG. 3 is a partial top view similar to FIG. 2, with the indexing table being in an index position.

Reference will now be made to FIG. 3, which shows the indexing table 22 in an index position. In such an index position, the first crank arm 56 is oriented directly toward the stationary gear 33. The first pinion 57 and the first cam roller 58 are located directly above the intermeshed cogs 55 of the first planetary gear and the cogs 35 of the stationary gear 33, such that the axis of rotation of the first cam roller 58 passes directly through the cogs 55. Any horizontally directed force applied to the roller is vertically in line with the meshed cogs 55. This characteristic is used to keep the index table 22 locked in an index position such that any force applied to the index table 22 will not move it from its precisely defined index position. The reason for this is as follows. When the first interfacing surface 59 of the index table 22 contacts the cylindrically shaped first cam roller 58, any forces transmitted from the first interfacing surface 59 are transmitted directly through the centre of rotation thereof. Because this centre of rotation is in line with the intermeshed cogs, any force transmitted to the first cam roller 58 also passes through the place where the cogs intermesh and therefore has no moment arm about the cogs. Resultingly, such a force could not move the first planetary gear from its position since it has some of its cogs meshed with cogs on the stationary gear 33 and must in effect be rotated about this point in order to move it. Thus, the index table 22 cannot cause the first rotating drive mechanism 50 to move and thus it cannot be unwantedly moved while in a index position. This above explanation of course also holds true for the second rotating drive mechanism 60.

Figure 4:
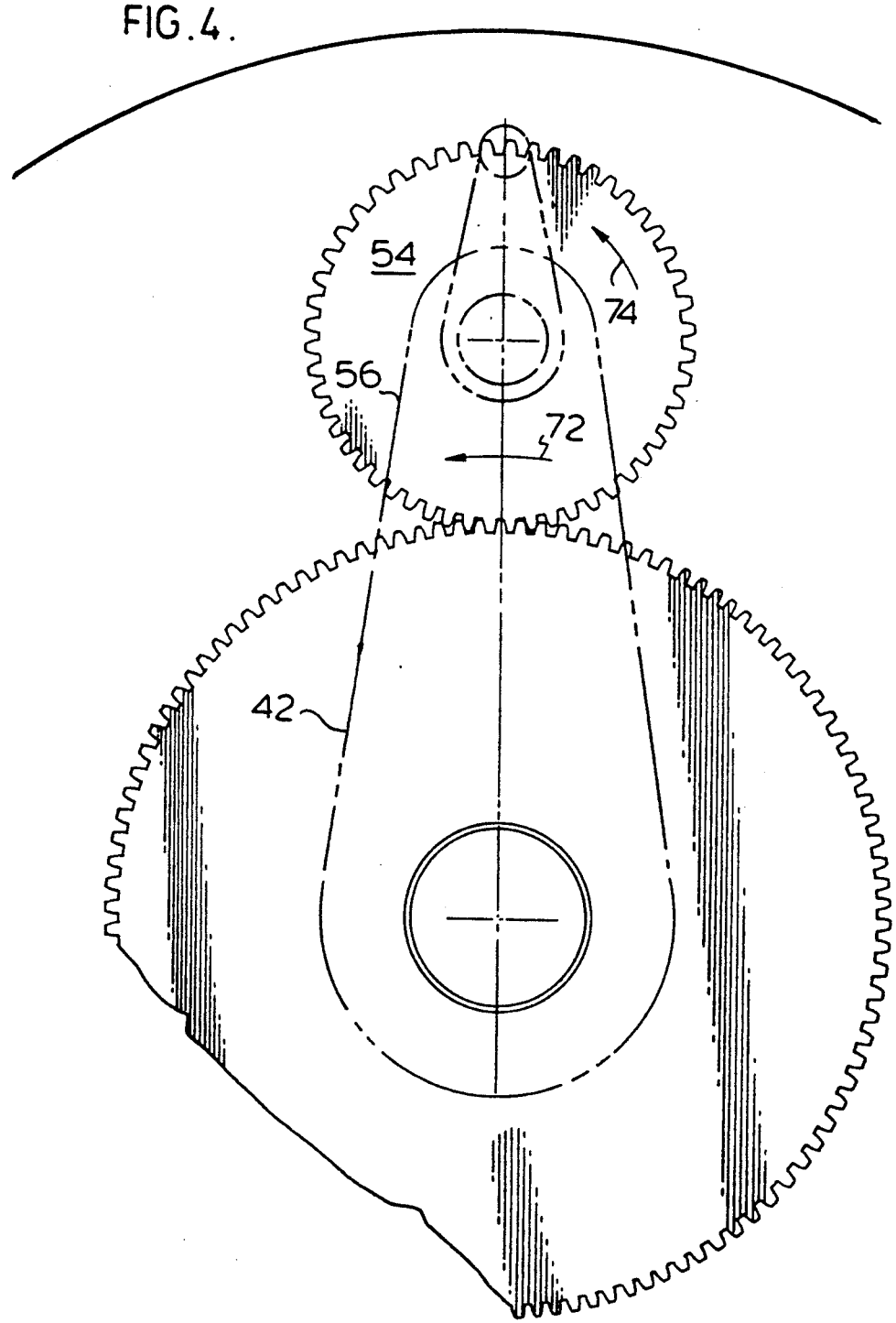
FIG. 4 is a partial top view similar to FIG. 2, with the indexing table being half way between two index positions.

To move from one index position to another, the apparatus of the present invention rotates the turntable 180°. At that point, the first crank arm 56 is again oriented directly toward the stationary gear 33. At a position 90° from each index position, which is a midway position, the crank arm is oriented directly away from the stationary gear 33. This position is illustrated in FIG. 4. The movement of the first rotating drive mechanism 50 in a counter-clockwise direction 72 about the central axis 24 causes the first crank arm 56 to also be moved in that direction around the central axis 24. Further, rotation of the first rotating drive mechanism 50 in a counter-clockwise direction 74 about the first planetary axis 51 causes the first crank arm 56 to additionally rotate in the same counter clockwise direction 74 about the first planetary axis 51. Resultingly, the movement of the first pinion 57 at the end of the first crank arm 56 is initially generally outwardly from the stationary gear 33 and along the first interfacing surface 59.

As the first cam roller 58 travels along the first interfacing surface 59, the first cam roller 58 is also pushing the first interfacing surface 59 in a counter-clockwise direction 72 about the central axis 24. Resultingly, the table 22 is also moved about the central axis 24. The rotating motion of the first interfacing surface 59 above the central axis 24 is not a constant speed—given that the main shaft 26 is travelling at a constant rotational speed—because of the geometry of the stationary gear 33, the first planetary gear 54 and the first crank arm 56.

The motion of the first cam roller 58 about the central axis 24 is initially slower due to the geometry of the gears 33 and 54 and the first crank arm 56. This causes an initial slow rotation of the table 22. As the first rotating drive mechanism 50 travels around the stationary gear 33 in counter-clockwise direction 72, the rotational speed of the table 22 increases until it is at a maximum, which occurs at the midway position between two index positions.

It is very important that an indexing table be positioned to a very high degree of accuracy, typically with less than 0.001 inches. Further, this accuracy must be reproducible time after time. It is therefore very important that the apparatus 20 that drives the indexing table 22 have no slack or looseness in it—that is to say between the various parts therein that are used to transfer motion from the drive motor 28 to the indexing table 22. In order to accomplish this, it is necessary that there be no space between any of the surfaces of any two juxtaposed motion transmission elements while the indexing table is in or near an index position. The motion transmission elements are the main shaft 26, the first drive arm 42 and the first rotating drive mechanism 50. These elements transmit motion from the drive motor 28 to the indexing table 22 to move the indexing table 22 in a counter clockwise direction 72. Correspondingly, the motion transmission elements that transmit motion from the drive motor 28 to the indexing table 22, to move the indexing table 22 in a clockwise direction 74, are the main shaft 26, the second drive arm 44 and the second rotating drive mechanism 60.

It can be seen that rotary motion is transferred from the main shaft 26 to the first drive arm 42 without relative motion between the two because the first drive arm 42 is rigidly attached to the main shaft 26. Motion is then transferred to the first hub 52, which must be rotatably yet securely seated in the first drive arm 42 in order that there is no relative translational motion in between the two. The motion is then transferred to the first crank arm 56 which is securely attached to the first hub 52 and then to the first pinion 57 which is in turn securely attached to the first crank arm 56. The first cam roller 58 must be rotatably yet snugly attached to the first pinion 57 to preclude translational movement between the two. Finally, the first cam roller 58 must be in intimate contact with the first interfacing surface 59 so that when the first cam roller 58 is pushed toward the first interfacing surface 59 there is no gap between the two and therefore no unwanted translational movement between the two.

It can be seen that when the main shaft is rotated such that the table 22 is rotated in a counter-clockwise direction 72, the rotating motion from the main shaft 26 is transferred directly to the first interfacing surface 59 because there is no spacing between any of the juxtaposed components in the motion transmission system.

Further, the first planetary gear 54 has the first side 80 of its cogs 55 in continual contact with the opposed first side 82 of the cogs 35 of the stationary gear 33. Thus, as soon as the first planetary gear 54 is moved around the stationary gear 33 by first drive arm 42, the first planetary gear 54 begins to rotate about the first planetary axis 51. This in turn causes the first crank arm 56 to rotate and ultimately move the indexing table 22. There is no slack in the gears and therefore there is no lag in the turning of the first planetary gear 54 and the first crank arm 56. Thus, the indexing table begins to move as soon as the main shaft 26 moves, without any mechanical "looseness" in the system.

Correspondingly, the same overall relationship exists between the main shaft 26, the second drive arm 44, the second rotating drive mechanism 60 and the indexing table 22.

Figure 5:
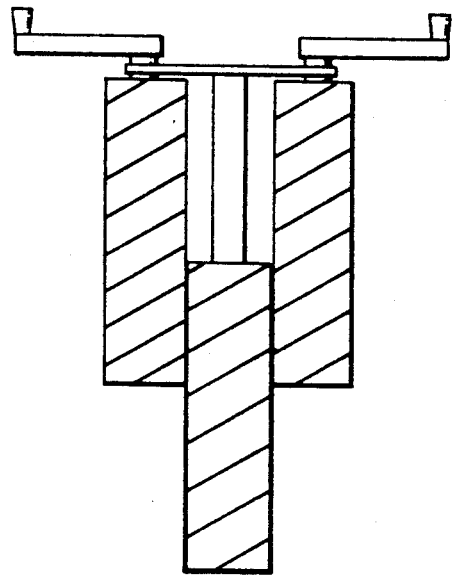
FIG. 5 is a side view of an alternative embodiment.

Reference will now be made to FIG. 5 which shows an alternative arrangement for the intermeshing gears (first planetary gear 54, second planetary gear 64 and stationary gear 33). In this embodiment, each of these gears is a worm gear. The overall drive mechanism operates in virtually the same manner as described in the preferred embodiment.

Figure 6:
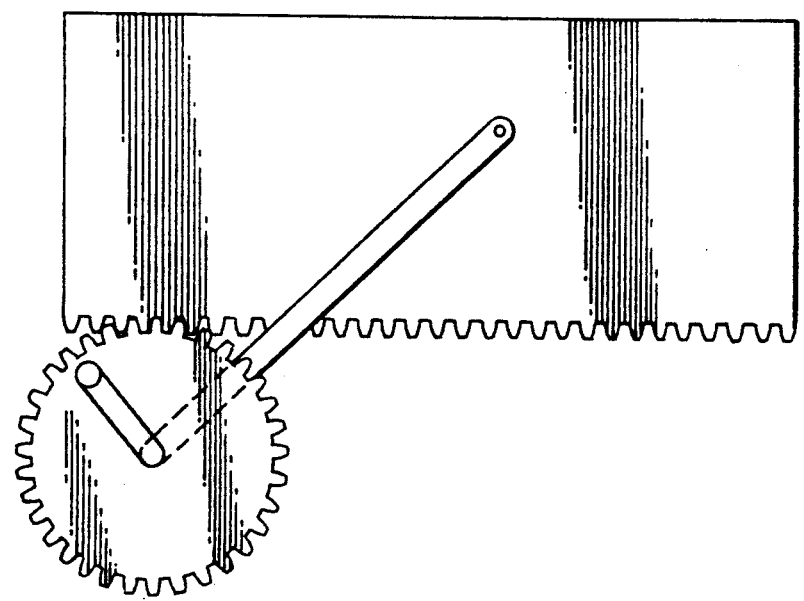
FIG. 6 is a top view a further alternative embodiment.

FIG. 6 shows a further alternative embodiment or in a stationary gear is a linear gear. The drive arm is rotated such that the planetary gears are moved along the length of the edges of the stationary gear. The crank arms move the table rotationally in the same manner, however, the indexing table can only be rotated in an oscillating manner and cannot be rotated continually in the same direction. In order for this embodiment to operated properly, it is necessary that the drive arm lengthen in each direction between its center of rotation and its end where it interfaces with the rotating drive mechanisms.

In a further alternative embodiment, it is contemplated that only one drive arm is necessary and that the first planetary gear and the second planetary gear could be placed side by side, or alternatively could be placed one above the other and having a common axis of rotation, with the hub that is attached to one being located inside the hub that is attached to the other.

Other modifications and alterations may be used in the design and manufacture of apparatus for moving an indexing turntable or the present invention without departing from the spirit and scope of the accompanying claims.

What is claimed is:

1. Apparatus for moving an indexing table and stopping it at a plurality of precisely defined positions, said indexing table being intended for carrying at least one workpiece between said plurality of precisely defined positions so that work can be performed on said workpiece at at least one of said plurality of precisely defined positions; said apparatus comprising:

a first gear mounted so as to be rotatably and translatably movable with respect to said indexing table said first gear having cogs at the perimeter thereof, said cogs having a first side and a second side;

a second gear mounted so as to be rotatably and translatably movable with respect to said indexing table said second gear having cogs at the perimeter thereof, said cogs having a first side and a second side;

a main gear having cogs intended for intermeshing with said cogs of said first and second gears;

moving means for effecting translational motion of said first gear and said second gear with respect to said main gear;

said first and second gears being interconnected such that translational movement of one effects corresponding translational movement of the other;

wherein said first gear and said second gear are each engaged with a main gear, wherein said first gear and said second gear are caused to rotate about their respective center axes when moved translationally by said moving means;

said first gear having a first interfacing portion that interfaces with said indexing table, with said first interfacing portion being located offset to the axis of rotation of said first gear;

wherein said first interfacing portion interfaces with a first receiving surface on said indexing table and is in contact therewith on a continual basis at least in the vicinity of each index position;

said second gear having a second interfacing portion that interfaces with said indexing table, with said second interfacing portion being located offset to the axis of rotation of said second gear;

wherein said second interfacing portion interfaces with a second receiving surface on said indexing table and is in contact therewith on a continual basis at least in the vicinity of each index position;

wherein a first side of said cogs of said first gear contact an opposed first side of said cogs of said main gear, said contact being such that is least one of said cogs of said first gear is in contact with at least one of said cogs of said main gear on a continual basis at least in the vicinity of each index position; and wherein a second side of said cogs of said second gear contact an opposed second side of said cogs of said main gear, said contact being such that at least one of said cogs of said second gear is in contact with at least one of said cogs of said main gear on a continual basis at least in the vicinity of each index position.

2. The apparatus of claim 1, wherein said indexing table moves rotationally.

3. The apparatus of claim 1, wherein said indexing table repeatedly moves said work pieces to said precisely defined positions with an accuracy of 0.001 inches.

4. The apparatus of claim 1, wherein said first gear, said second gear, and said main gear are spur gears.

5. The apparatus of claim 1, wherein said first gear, said second gear, and said main gear are helical gears.

6. The apparatus of claim 1, wherein said first and second gears have a gear ratio of 1:2 to said main gear.

7. The apparatus of claim 1, wherein said first and second gears have a gear ratio of 1:3 to said main gear.

8. The apparatus of claim 1, wherein said first and second gears have a gear ratio of 1:4 to said main gear.

9. The apparatus of claim 1, wherein said first and second gears have a gear ratio of 1:5 to said main gear.

10. The apparatus of claim 1, wherein said first and second gears have a gear ratio of 1:6 to said main gear.

11. The apparatus of claim 1, wherein said first and second gears have a gear ratio of 2:3 to said main gear.

12. The apparatus of claim 1, wherein said first and second gears have a gear ratio of 3:5 to said main gear.

13. The apparatus of claim 1, wherein said first interfacing portion is located such that an axis passing therethrough and parallel to the axis of rotation of said first gear passes through the area of contact between said first gear and said main gear; and wherein said second interfacing portion is located such that an axis passing therethrough and parallel to the axis of rotation of said second gear passes through the area of contact between said second gear and said main gear.

14. The apparatus of claim 1, wherein the effective radii of said first gear and of said second gear are the same and are one-half the effective radius of said main gear.

15. The apparatus of claim 1, wherein the effective radii of said first gear and of said second gear are the same and are one-quarter the effective radius of said main gear.

16. The apparatus of claim 1, wherein said moving means comprises a rotating drive shaft and at least one drive arm, wherein said drive shaft is centrally located between said first and second gears and said at least one drive arm interconnects said first and second gears to said drive shaft.

17. The apparatus of claim 1, wherein said at least one drive arm comprises a first drive arm and a second drive arm displaced on opposite sides of said drive shaft to each other, said first drive arm interconnecting with said first gear and said second drive arm interconnecting with said second gear.

18. The apparatus of claim 16, wherein said at least one drive arm is a single drive arm extending outwardly from said drive shaft, said first and second gears interconnecting with said single drive arm.

19. The apparatus of claim 1, wherein said first gear, said second gear, and said main gear are worm gears.

20. The apparatus of claim 1, wherein said main gear has a substantially straight surface having cogs thereon for intermeshing with said first gear and said second gear.

21. An indexing table adapted for moving between and stopping at a plurality of precisely defined positions, said indexing table being intended for carrying at least one workpiece between said plurality of precisely defined positions so that work can be performed on said workpiece at at least one of said plurality of precisely defined positions; said apparatus comprising:

a first gear mounted so as to be rotatably and translatably movable with respect to said indexing table said first gear having cogs at the perimeter thereof, said cogs having a first side and a second side;

a second gear mounted so as to be rotatably and translatably movable with respect to said indexing table said second gear having cogs at the perimeter thereof, said cogs having a first side and a second side;

a main gear having cogs intended for intermeshing with said cogs of said first and second gears;

moving means for effecting translational motion of said first gear and said second gear with respect to said main gear;

said first and second gears being interconnected such that translational movement of one effects corresponding translational movement of the other;

wherein said first gear and said second gear are each engaged with a main gear, wherein said first gear and said second gear are caused to rotate about their respective center axes when moved translationally by said moving means;

said first gear having a first interfacing portion that interfaces with said indexing table, with said first interfacing portion being located offset to the axis of rotation of said first gear;

wherein said first interfacing portion interfaces with a first receiving surface on said indexing table and is in contact therewith on a continual basis at least in the vicinity of each index position;

said second gear having a second interfacing portion that interfaces with said indexing table, with said second interfacing portion being located offset to the axis of rotation of said second gear;

wherein said second interfacing portion interfaces with a second receiving surface on said indexing table and is in contact therewith on a continual basis at least in the vicinity of each index position;

wherein a first side of said cogs of said first gear contact an opposed first side of said cogs of said main gear, said contact being such that is least one of said cogs of said first gear is in contact with at least one of said cogs of said main gear on a continual basis at least in the vicinity of each index position; and wherein a second side of said cogs of said second gear contact an opposed second side of said cogs of said main gear, said contact being such that at least one of said cogs of said second gear is in contact with at least one of said cogs of said main gear on a continual basis at least in the vicinity of each index position.

* * * * *